Patented Oct. 1, 1929

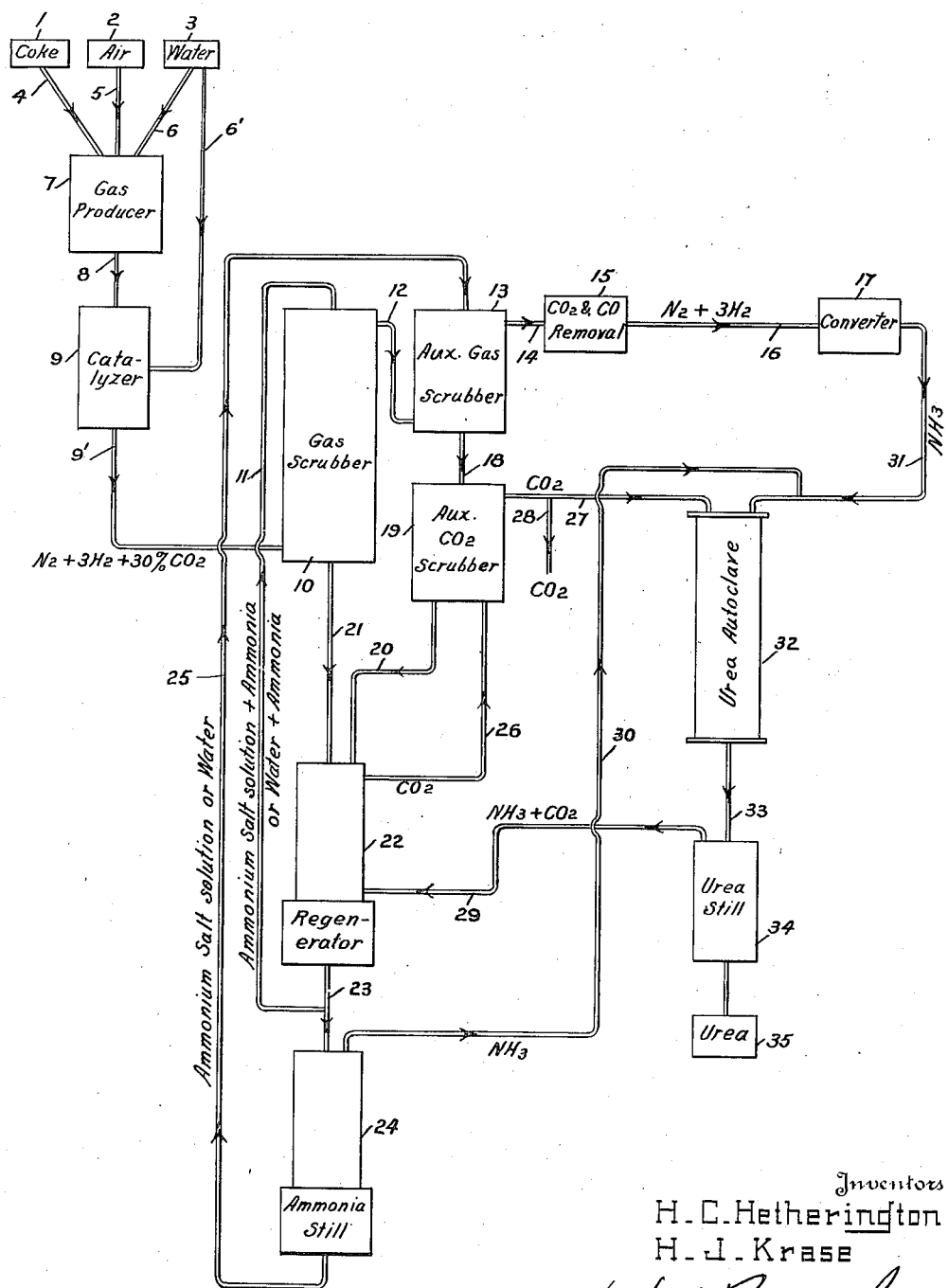

1,730,208

UNITED STATES PATENT OFFICE

HARRY C. HETHERINGTON, OF WASHINGTON, DISTRICT OF COLUMBIA, AND HERBERT J. KRASE, OF CLARENDON, VIRGINIA, ASSIGNORS TO ARTHUR B. LAMB, TRUSTEE

PROCESS FOR PRODUCTION OF UREA

Application filed March 2, 1926. Serial No. 91,832.

This invention relates to a process for the production of urea directly from such common and readily obtained materials as coke, air and water, and has particular reference to the novel means by which an economic co-ordination of the ammonia and urea syntheses may be effected.

It is generally known that ammonia can be made directly from nitrogen and hydrogen. When hydrogen is produced by a water gas process or by a combination of water gas and producer gas processes, large quantities of carbon dioxide are produced which must be removed before the hydrogen can be made to combine with the nitrogen. Thus, for every volume of ammonia produced, there is usually obtained considerably more than an equal volume of carbon dioxide when the water gas catalytic process is used. The efficient removal and economic utilization of the carbon dioxide produced by this process has been a serious problem.

It is also generally known that urea can be made from ammonia and carbon dioxide. It is evident that the manufacture of urea offers a possible solution for the problem of carbon dioxide disposal from the ammonia process.

Previously known methods for the removal of carbon dioxide from ammonia synthesis gases are not economically adapted for utilization in any previously known urea process.

Now we have discovered a method whereby the synthesis of urea may be so combined with the removal of carbon dioxide from ammonia synthesis gases that important economies may be effected in both processes.

In our copending application entitled, "Process for the purification of gases", Ser. No. 91,835 we have disclosed a method whereby the ammonia synthesis gases may be substantially freed of carbon dioxide and the latter gas recovered in a high degree of purity. That process involves the separation of carbon dioxide from ammonia by means of an aqueous solution of an ammonium salt which solution is run through a scrubbing tower counter-current to the gases. The solution issuing from the tower is heated from 60° C. to 100° C. and the carbon dioxide expelled. This carbon dioxide is substantially pure but may contain traces of ammonia and water. The trace of ammonia may be removed by scrubbing the gas with water or ammonium nitrate solution.

In our copending application entitled, "A method for the manufacture of urea", Serial No. 91,831 we have disclosed a method whereby the synthesis of urea from ammonia and carbon dioxide may be effected in a continuous manner, with complete utilization of the materials entering the process. That process also involves the separation of carbon dioxide from ammonia by means of an aqueous solution of an ammonium salt. The process also involves drying the separated gases and returning them separately or together to the urea forming system.

We have found that the synthetic ammonia process and the synthetic urea process may be so combined that the operation involving the separation of ammonia from carbon dioxide, common to both processes, may be carried out in one apparatus, with consequent saving in installation and operating costs of both processes.

The objects and advantages of this invention will be apparent by reference to the following description when read in connection with the accompanying flow sheet, which illustrates the various steps of the process.

In the flow sheet a source of coke supply is indicated at 1 and air supply at 2 and a supply of water at 3. These materials are conveyed from the sources by their respective conveyors 4, 5 and 6 to the gas producer 7 from which the gases are led by pipe 8 to water gas catalyzer 9 water being also supplied to the catalyzer from the source of water supply 3 through the pipe 6'. The gases from the catalyzer are led through the pipe 9' to the gas scrubber 10 through which they flow counter-current to an ammonium salt solution plus ammonia which is admitted to the scrubber through the pipe 11. The solution from the scrubber passes through the pipe 21 to the regenerator 22 from which regenerator carbon dioxide escapes through the pipe 26 the ammonium salt solution plus ammonia passing again through the pipe 11 while other portions of the solution pass through pipe 23 to the ammonia still. From the ammonia still ammonium salt solution or water passes through the pipe 25 to the auxiliary gas scrubber 13 to which gases have passed from the main gas scrubber through the pipe 12. The solution from this auxiliary gas scrubber passes through the pipe 18 to an auxiliary $CO_2$ scrubber 19 and from that through the pipe 20 to the regenerator. The gases from the auxiliary gas scrubber 13 are led through a pipe 14 to the device for removing carbon dioxide and carbon monoxide 15 from which the nitrogen and hydrogen gases pass through the pipe 16 to a converter 17. From the converter the ammonia is led through pipe 31 to the autoclave 32. The ammonia escaping from the ammonia still 24 is led through pipe 30 to the urea autoclave while some of the carbon dioxide coming from the auxiliary carbon dioxide scrubber 19 is led through pipe 27 to the urea autoclave, the excess of carbon dioxide being discharged through pipe 28. The solution from the urea autoclave is led through pipe 33 to the urea still 34 from which still the urea passes to the receptacle 35 while the uncombined ammonia and carbon dioxide are discharged through pipe 29 back to regenerator 22.

In the flow-sheet, a source of coke supply is indicated at 1, an air supply, at 2, and a supply of water (steam) at 3. These materials are conveyed from the sources by their respective conveyors, 4, 5, and 6, to the gas producer 7. The gas producer 7 makes a gas having substantially the following composition:

|  | Per cent |
|---|---|
| $CO_2$ | 3– 5 |
| CO | 39– 36 |
| $H_2$ | 34– 36 |
| $N_2$ | 23– 22 |
| $CH_4$, argon, etc. | 1– 1 |
|  | 100–100 |

This gas is conveyed by pipe 8, to the catalyzer 9, wherein it is mixed with water (steam) entering through pipe 6' and subjected to the action of a catalyst, which catalyst in the known manner causes the carbon monoxide in the gas to react with the steam, forming carbon dioxide and hydrogen. The gas leaving the catalyst by means of pipe 9' analyzes, in the dry state, substantially as follows:

|  | Per cent |
|---|---|
| $CO_2$ | 29– 27 |
| CO | 2– 4 |
| $H_2$ | 52– 52 |
| $N_2$ | 17– 17 |
| Total | 100–100 |
| ($CH_4$, argon, etc.) | 0.4– 0.8 |

By means of pipe 9', the gas passes to the gas scrubber 10, through which it flows counter-current to an ammonium salt solution plus ammonia or a solution of ammonia in water, which is admitted to the scrubber through the pipe 11. In the scrubber the carbon dioxide in the gas unites with the ammonia, forming ammonium carbonate in solution. The scrubbed gas has substantially the following composition:

|  | Per cent |
|---|---|
| CO | 3– 5 |
| $H_2$ | 73– 72 |
| $N_2$ | 24– 23 |
| Total | 100–100 |
| ($CH_4$, $NH_3$, argon) | 0.5–1.0 |

The scrubbed gas leaves the gas scrubber 10 by means of pipe 12, passing into and through an auxiliary gas scrubber 13, where the gas is again scrubbed with an ammonium salt solution or with water coming from ammonia still 24, through pipe 25. In the auxiliary gas scrubber 13 small amounts of ammonia which may be in the gas are removed, the gas thence passing by means of 14 to a device 15 for removing the last traces of carbon monoxide and carbon dioxide. The gases then pass by means of pipe 16 to converter 17, where they are converted to ammonia in a known manner.

The solution leaving the gas scrubber 10 by means of pipe 21, flows into regenerator 22, wherein the carbon dioxide is expelled by heating to from 60° C. to 100° C., said carbon dioxide leaving by pipe 26, passing through the auxiliary carbon dioxide scrubber 19, wherein any trace of ammonia is removed and carried out by the scrubbing solution entering by pipe 18 and leaving scrubber 19 by means of pipe 20, flowing thence into regenerator 22. The solution leaving regenerator 22 is divided, part flowing by means of pipe 23 into ammonia still 24, wherein the dissolved free ammonia is expelled, leaving still 24 by means of pipe 30, and then being reintroduced into the urea autoclave by means of compressors and pumps not shown. The solution leaving the ammonia still 24 by means of pipe 25, then flows in series through the auxiliary gas scrubber 13 and the auxiliary carbon dioxide scrubber 19, as has been described.

Since usually more carbon dioxide is produced than is necessary to combine with all the ammonia made, part of the carbon dioxide coming from scrubber 19 flows through pipe 28, where it may be put to various uses. Sufficient carbon dioxide to combine as urea with the ammonia introduced through pipe 31 is introduced into autoclave 32 by means of pipe 27. The pumps usually used for effecting the introduction of the ammonia and carbon dioxide are not shown in the flow sheet. While in the autoclave 32, which is maintained at urea-forming temperatures, the ammonia and carbon dioxide react together to form ammonium carbamate, which then reacts to form urea and water. The extent to which urea formation from ammonium carbamate takes place is determined by the temperature of the autoclave; usually the yield is between 40 and 50 per cent of the theory. The converted charge leaves the auto-clave 32, where it is under a pressure of 60 to 100 atmospheres, by means of pipe 33, and enters the urea still 34, where it is under a pressure of 1 to 5 atmospheres. In the urea still the unconverted ammonia and carbon dioxide, combined as ammonium carbamate and carbonate, are expelled, leaving the still 34 by means of pipe 29, thence entering the regenerator 22. In the regenerator the ammonia dissolves in the solution, thence passing out to the ammonia still 24, while the carbon dioxide is expelled from the solution and leaves by pipe 26. From the urea still, the urea flows to receptacle 35, dissolved in water and can be readily recovered in a known manner. The above-mentioned flow sheet and description refer to only the steps necessary for a proper understanding of the process. Other pieces of apparatus, such as are necessary for the practical operation of the process, have been omitted for the sake of clearness in description, but will be recognized by those skilled in the art as necessary.

We have found in practice that the solution leaving the gas scrubber may be regenerated in one and the same apparatus as that used for separating ammonia and carbon dioxide, delivered from the urea synthesis system, with consequent saving in installation and operating costs. The regenerator may consist of one or more units, depending on the scale of operation, consequently the combination of functions herein described may be fulfilled by any one or more of the units constituting the regenerator.

A further advantage of thus combining the functions of the regenerating apparatus lies in the fact that part or all of the solution otherwise used solely to separate the ammonia and carbon dioxide may be first used in the auxiliary towers previously mentioned for the removal of the small amounts of ammonia in the gases from the gas scrubber and in the carbon dioxide from the regenerator, thus reducing the volume of solution which must be treated.

When the gases for ammonia synthesis are produced by the water gas catalyst process, considerably more carbon dioxide is produced than is necessary to combine with all the ammonia to form urea. It will be seen then that the process in addition to yielding urea, will also supply very pure carbon dioxide gas, which may be applied to other well known uses.

While we have indicated in the above description and flow sheet one possible utilization of our invention, it will be realized that it can be applied to any process whereby ammonia is made from gases containing carbon dioxide at some one stage of the process, the ammonia then being converted to urea by combination with the aforesaid carbon dioxide; hence we do not wish to be limited to any particular process.

What we claim is:

1. The process of producing urea from synthetic ammonia made from gases containing carbon dioxide, nitrogen and hydrogen including separating the hydrogen and nitrogen from the carbon dioxide by absorption in an aqueous solution of an ammonium salt, recovering the carbon dioxide, combining the hydrogen and nitrogen to form ammonia, combining the carbon dioxide with the ammonia to form urea, and removing the carbon dioxide present in the unconverted urea synthesis gases, the process being characterized by this, namely, that the carbon dioxide recovery from the ammonia synthesis gases and carbon dioxide removal from the urea synthesis gases are effected together in the same operation.

2. The process of producing urea from synthetic ammonia made from gases containing carbon dioxide, nitrogen and hydrogen including, separating the hydrogen and nitrogen from the carbon dioxide by absorption in an aqueous solution of an ammonium salt, combining the hydrogen and nitrogen to form ammonia, recovering the carbon dioxide, combining the carbon dioxide with ammonia to form urea, recovering the carbon dioxide present from the unconverted urea synthesis gases, recovering the ammonia present in the unconverted urea synthesis gases, the process being characterized by this, namely, that the carbon dioxide recovery from the ammonia synthesis gases and the carbon dioxide recovery from the urea synthesis gases are effected together in the same operation.

3. The process of producing urea from synthetic ammonia made from gases containing carbon dioxide, nitrogen and hydrogen including scrubbing the gases with an aqueous solution of an ammonium salt to remove the carbon dioxide, combining the remaining nitrogen and hydrogen to form ammonia, recovering the carbon dioxide from the solution resulting from the scrubbing, combining such carbon dioxide with the ammonia to form urea, removing the unconverted gases from the urea solution and introducing such gases to the solution resulting from the original gas scrubbing and recovering the carbon dioxide from the urea solution together with the carbon dioxide from the original solution for use in the further synthesis of urea.

HARRY C. HETHERINGTON.
HERBERT J. KRASE.